(12) United States Patent
Bornt

(10) Patent No.: US 9,439,531 B1
(45) Date of Patent: Sep. 13, 2016

(54) METHOD OF USING A PORTABLE BEVERAGE BREWING MACHINE

(71) Applicant: Alan J. Bornt, Holtville, CA (US)

(72) Inventor: Alan J. Bornt, Holtville, CA (US)

( * ) Notice: Subject to any disclaimer, the term of this patent is extended or adjusted under 35 U.S.C. 154(b) by 0 days.

(21) Appl. No.: 14/740,167

(22) Filed: Jun. 15, 2015

(51) Int. Cl.
*A47J 31/06* (2006.01)
*A23F 5/26* (2006.01)
*A47J 31/02* (2006.01)
*B65B 61/20* (2006.01)
*B65B 29/06* (2006.01)

(52) U.S. Cl.
CPC ............ *A47J 31/0626* (2013.01); *A23F 5/262* (2013.01); *A47J 31/02* (2013.01); *B65B 29/06* (2013.01); *B65B 61/20* (2013.01)

(58) Field of Classification Search
CPC ..... A47J 31/02; A47J 31/0626; B65B 29/06; B65B 61/20; A23F 5/262
See application file for complete search history.

(56) References Cited

U.S. PATENT DOCUMENTS

| | | | |
|---|---|---|---|
| 1,560,471 A | 11/1925 | Home | |
| 2,743,664 A | 5/1956 | Dale | |
| 2,885,290 A | 5/1959 | Krasker | |
| 3,971,305 A | 7/1976 | Daswick | |
| 4,075,107 A * | 2/1978 | Smith | A47J 31/08 210/493.1 |
| 4,176,588 A | 12/1979 | Baron | |
| 4,619,830 A * | 10/1986 | Napier | A47J 31/06 206/0.5 |
| 5,012,629 A * | 5/1991 | Rehman | B65B 29/02 206/0.5 |
| 5,176,830 A * | 1/1993 | Wiggins | A47J 31/06 210/477 |
| 5,906,845 A * | 5/1999 | Robertson | B65D 85/804 426/112 |
| 5,941,055 A * | 8/1999 | Coates | B65B 29/06 425/112 |
| 6,038,963 A * | 3/2000 | Patterson | A47J 31/0626 99/287 |
| 6,138,551 A | 10/2000 | Bauer et al. | |
| 6,189,438 B1 * | 2/2001 | Bielfeldt | A47J 31/08 210/493.5 |
| 7,389,720 B2 * | 6/2008 | Haverstock | A47J 31/20 99/287 |
| 7,559,274 B2 * | 7/2009 | Wilhite | A47J 31/20 426/433 |
| 7,926,414 B1 | 4/2011 | Wolcott et al. | |
| 2005/0217213 A1 | 10/2005 | Lozinski et al. | |
| 2011/0303094 A1 | 12/2011 | Lown | |
| 2012/0183659 A1 | 7/2012 | Hulett et al. | |
| 2012/0321769 A1 | 12/2012 | Otto | |

FOREIGN PATENT DOCUMENTS

EP 0631948 4/1995

* cited by examiner

*Primary Examiner* — Anthony Weier
(74) *Attorney, Agent, or Firm* — Buche & Associates, P.C.; John K. Buche; Bryce A. Johnson

(57) ABSTRACT

Shown is a portable beverage apparatus. Also shown is a portable single serve beverage brewing apparatus designed to be used in conjunction with various single serve brewing apparatus or by itself.

1 Claim, 11 Drawing Sheets

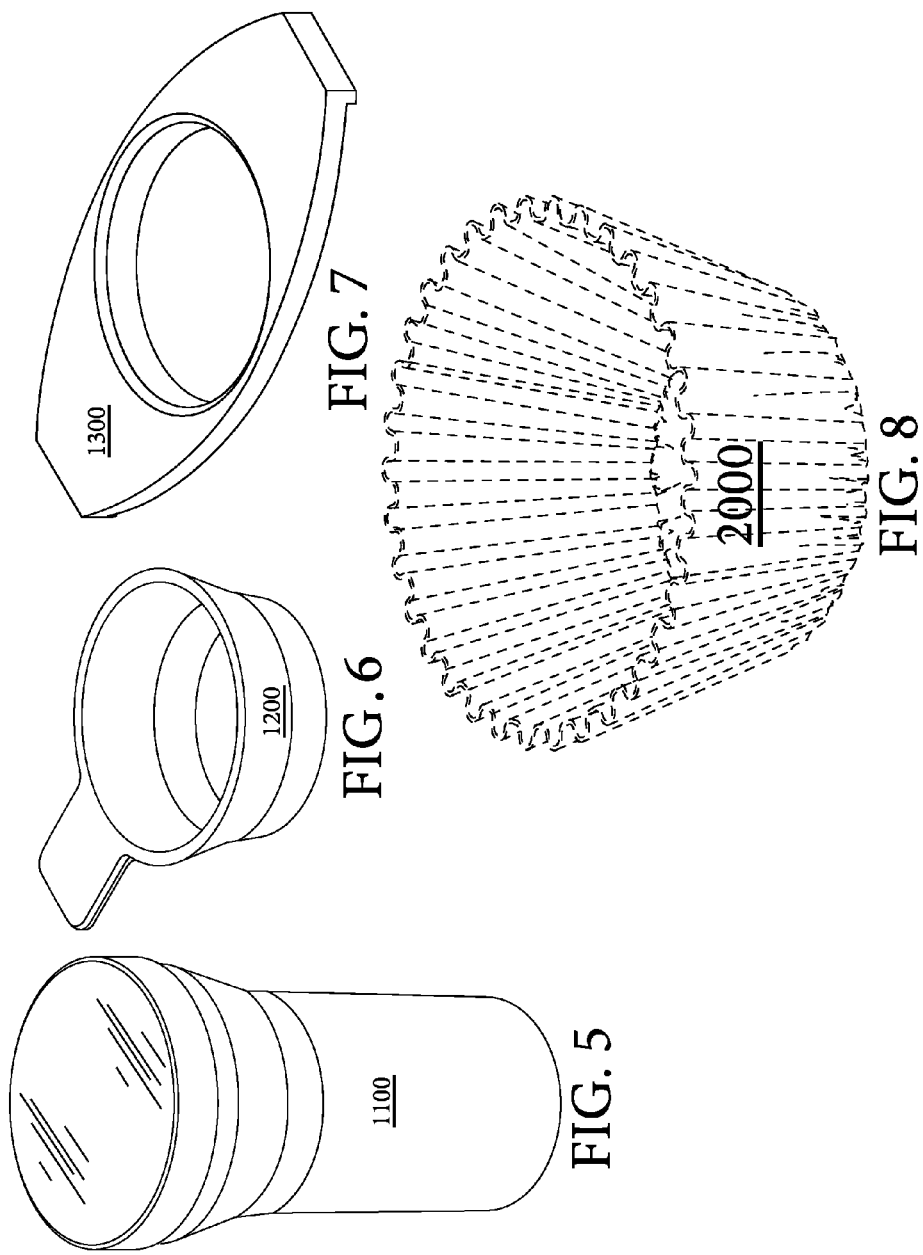

METHOD OF USING A PORTABLE BEVERAGE BREWING MACHINE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of Invention

The subject matter of this application is in the field portable single serve brewing apparatus and a method for brewing coffee or the like using the same.

2. Background

Brewed or steeped beverages are popular drinks throughout the United States and around the world. Coffee and tea are just two examples of brewed or steeped beverages that are consumed in large quantities on a daily basis. Many different types of brewing or steeping apparatus or applications are known and have proven useful for preparing brewed or steeped beverages.

Recently, "single-serve" (typically around twelve ounces or less) brew beverage apparatus have become common. However, these apparatus are not portable and, as a result, do not meet the needs of transient beverage drinkers. Furthermore, known beverage apparatus do not provide for customization of the brewing process to the taste of the beverage drinker. Portability and customization are particularly important in the office work-place setting where typically a single beverage apparatus must serve a variety of beverage consuming pallets or where every beverage consumer must bring a beverage apparatus into the work place.

Another problem that exist involves beverage apparatus with reusable cartridges. Typically, these apparatus offer the ability to customize a drink but offer poor filtering mechanics, leaving much of the micro grinds in a beverage. Also, reusable cartridges are difficult to clean and are "apparatus specific," meaning they can only be used with one apparatus. Yet still, these reusable cartridges are not easily used to produced customized drinks. Thus, a need exists for a system that is more universal and that features customizable filtration.

SUMMARY OF THE INVENTION

In view of the foregoing, an objective of this disclosure is to describe a beverage brewing apparatus that is portable and capable of customizable brewing of beverages. Another objective of the disclosure is to describe a beverage brewing apparatus with customizable filtration capabilities. In one embodiment, disclosed is a portable beverage apparatus for brewing coffee, tea, or the like. In a preferred embodiment, the beverage apparatus comprises a plunger, a wedge ring, and a base. Preferably, the plunger may be a substantially hollow cylinder with a cap that defines a storage receptacle for a beverage brewing material. Suitably, the wedge ring defines a convergingly tapering annulus and a pull tab and may be configured for axial movement along the exterior of the plunger into a cooperating and interfacing relation with an annular outward taper of the plunger that is adjacent to the cap. A preferred embodiment of the base features a platform with an orifice that is capable of coaxially receiving the wedge ring and interfacing with the outside of the annulus of the wedge ring via a friction fit. In a preferred mode of operation, one or more paper filters, e.g., a basket coffee filter, may be molded around the plunger and provided between the friction fit of the wedge ring and the base so that the base and wedge ring may support the filter in a dangling configuration. The selection of number of filters will depend on whether the user would like a "cleaner" beverage where micro grinds are removed from the beverage. When so assembled, brew material may be deposited in the filter and dangled over or within a beverage container for brewing a beverage.

In one mode of use: (1) a beverage filter may be molded around the plunger and held between the wedge ring and base; (2) the plunger with drawn from the filter so that the filter is retained between the wedge ring and base in a basked form with the shape of the plunger; (3) a beverage brewing material may be deposited within the filter and a beverage brewed via pour-over, steeping, or a combination of the two brewing techniques; and, the filter may be discarded after it is removed from between the wedge ring and base.

Other objectives and desires may become apparent to one of skill in the art after reading the below disclosure and viewing the associated figures. Also, these and other embodiments will become apparent from the drawings.

BRIEF DESCRIPTION OF THE FIGURES

The manner in which these objectives and other desirable characteristics can be obtained is explained in the following description and attached figures in which:

FIG. 5 is a perspective view of a plunger;

FIG. 6 is a perspective view of a wedge ring;

FIG. 7 is a perspective view of a base;

FIG. 8 is a perspective view of a filter;

It is to be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

DETAILED DESCRIPTION OF PREFERRED EMBODIMENTS

In general, described is a beverage brewing apparatus that is portable and capable of customizable brewing of beverages. In a preferred mode of operation, filter paper is molded around a plunger, secured to a base via a wedge ring, and dangled over or within a beverage container for brewing a beverage. During periods of non-use, the apparatus may operate as a storage receptacle for beverage brewing material and is easily portable. The more specific features of a preferred embodiment of a brewing apparatus are disclosed in connection with the figures.

Figures 1, 2:
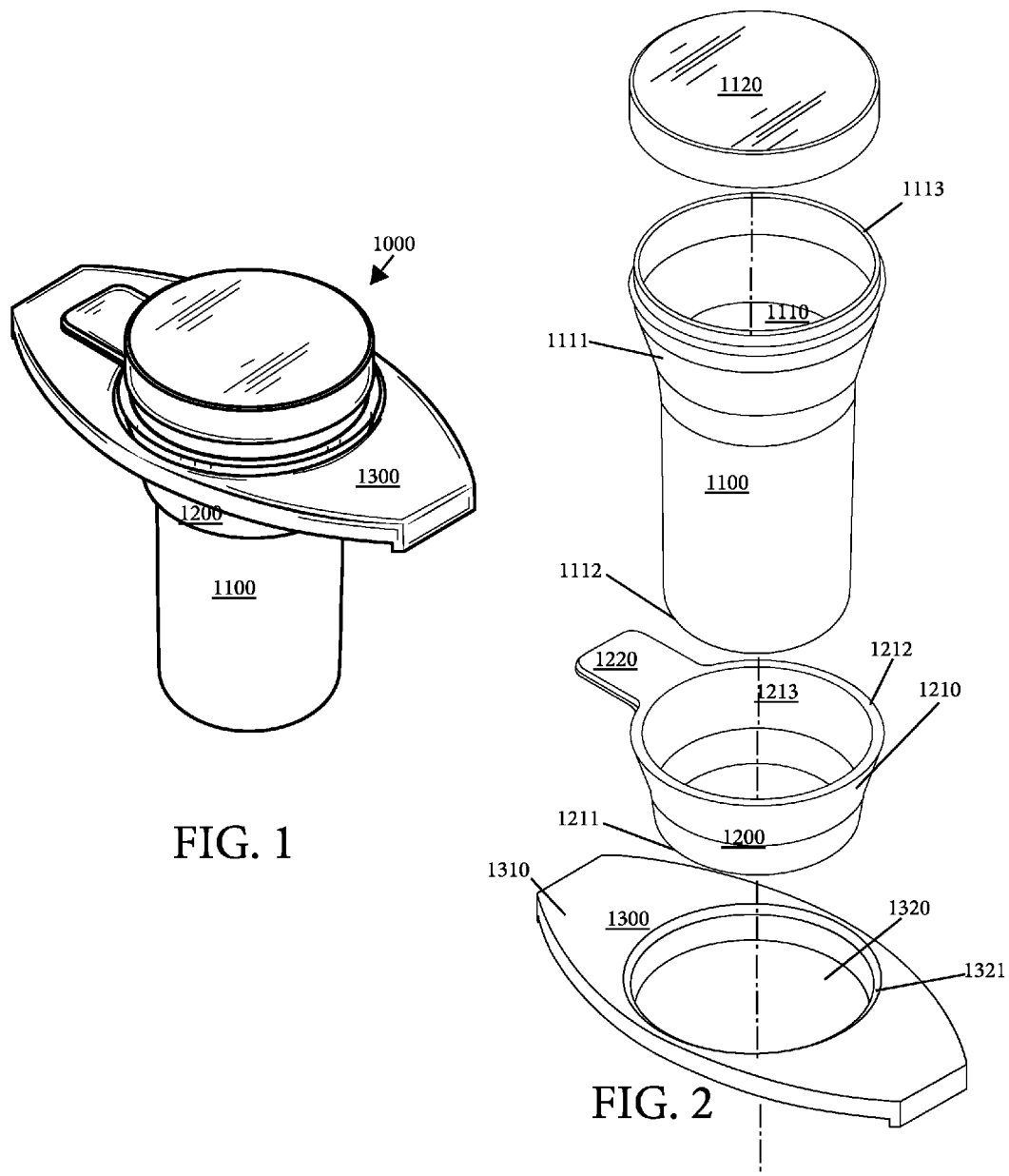
FIG. 1 is a perspective view of a portable beverage apparatus.
FIG. 2 is an exploded view of the beverage apparatus of FIG. 1.
Figures 3, 4:
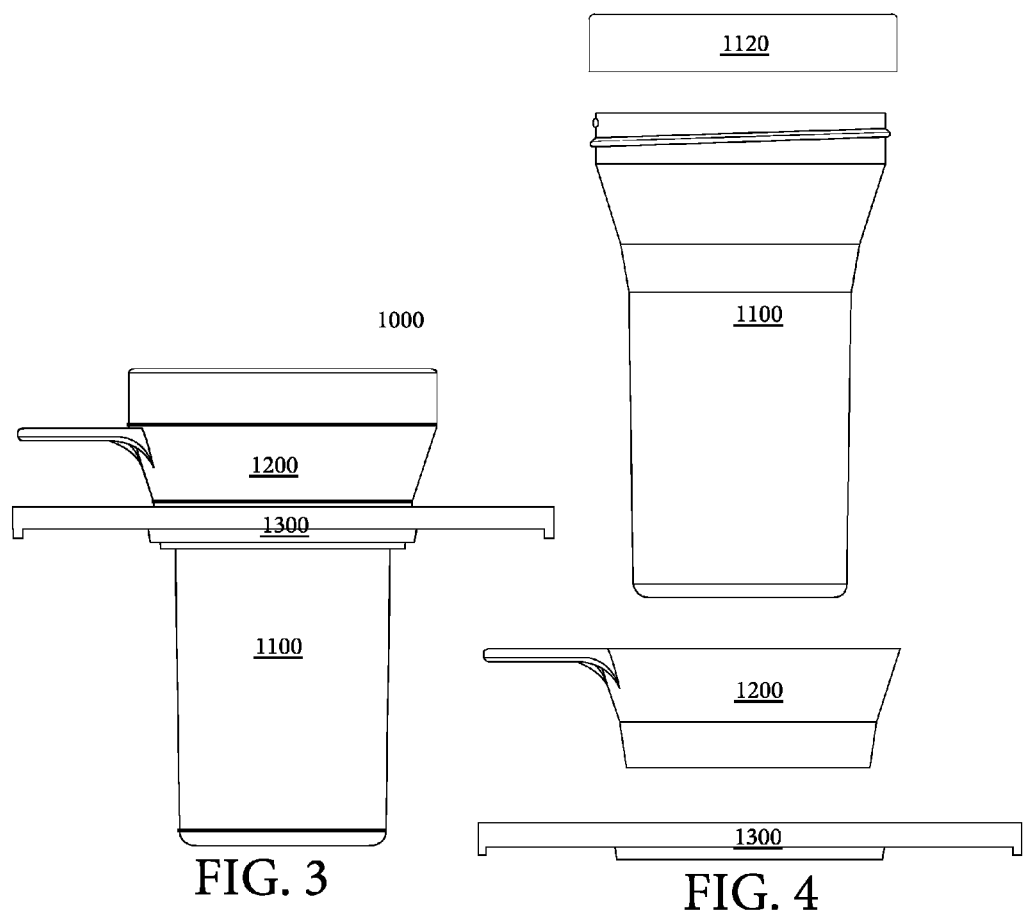
FIG. 3 is a side view of the beverage apparatus of FIG. 1.
FIG. 4 is an exploded view of the beverage apparatus of FIG. 3.

FIG. 1 is a perspective view of a portable beverage apparatus 1000. FIG. 2 is an exploded view of the beverage apparatus 1000 of FIG. 1. FIGS. 3 and 4 are respectively a side view and an exploded side-view of the beverage apparatus 1000. As shown, the beverage apparatus 1000 comprises: a plunger 1100; a wedge ring 1200, and a base 1300. As shown, the apparatus 1000 is an assembly of the plunger 1100, wedge ring 1200, and base 1300 wherein the parts are coaxially mated by restriction fit. As discussed in greater detail below, the apparatus 1000 may be assembled around a beverage filter (not shown) to mold the filter (not shown) into a basket type configuration whereby beverages may be brewed via a variety of brewing techniques.

Referring to FIGS. 2 and 4, the plunger 1100 is a substantially hollow and cylindrical receptacle 1110 with a cap 1120. As discussed in greater detail below, the receptacle 1110 is preferably capable of receiving and retaining beverage brewing material like coffee grinds or tea leaves. As shown, the plunger 1110 has an outwardly tapering open upper end 1111 and a closed lower end 1112 with an upper rim 1113 being defined about the mouth of the open upper end 1111. The plunger 1110 has side walls which extend upwardly from the lower end 1112 to the outwardly and radially tapered upper end 1111 adjacent to the rim 1113. In one embodiment, the rim is threaded so that it may screw into a cap 1120.

Still referring to FIGS. 2 and 4, the wedge ring 1200, includes a convergingly tapering annulus with an open lower end 1211 and an upper end 1212 which comprises an upper interfacing surface 1213. As indicated by the broken arrowed lines of FIGS. 2 and 4, the wedge ring 1200 is adapted to be moved axially over the side walls of the plunger until the rim interfacing surface 1213 is in interfacing engagement with the tapered upper end 1111 of the plunger (see FIGS. 1 and 3). In one mode of operation, the wedge ring 1200 is shaped as, and may operate in the manner of, a funnel. A primary function of the wedge ring 1200, as discussed below, is to retain a filter (not shown) within the base 1300 after the filter has been molded into a basket in the shape of the plunger.

Yet still referring to FIGS. 2 and 4, the base 1300 is defined by a platform 1310 having an orifice 1320 which is open with an upper lip 1321. This base 1300 may be adapted to telescopingly mate with the outside of the wedge ring with the lip 1321 in an abutting engagement with outside of the annulus 1213 of the wedge ring 1200 (see FIGS. 1 and 3).

FIG. 5 is a perspective view of the preferred embodiment of the plunger 1110, with the cap 1120 secured thereto. FIG. 6 is a perspective view of the preferred embodiment of the wedge ring 120. FIG. 7 is a perspective view of the preferred embodiment of the base; 1300. FIG. 8 is a perspective view of a paper filter 2000 (e.g., a basket filter) (in later figures the filter is shown in broken lines and transparent so that the operation of the other components can be seen. The use of the above-described components will now be explained, the same being adapted for distinct steps in brewing processes. These processes are discussed later in connection with FIGS. 13-16.

Figure 9:
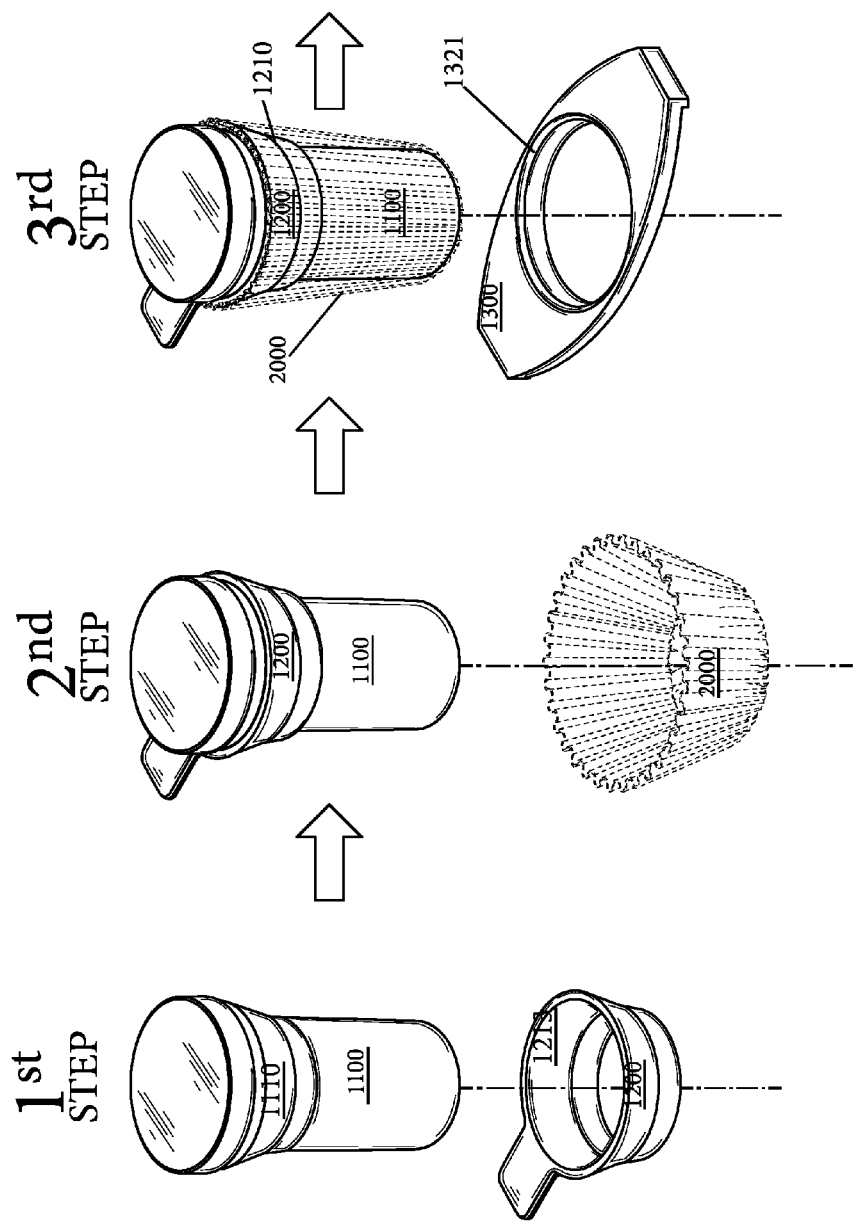
FIG. 9 is flow diagram showing steps of assembling an operable configuration for the beverage apparatus.
Figure 10:
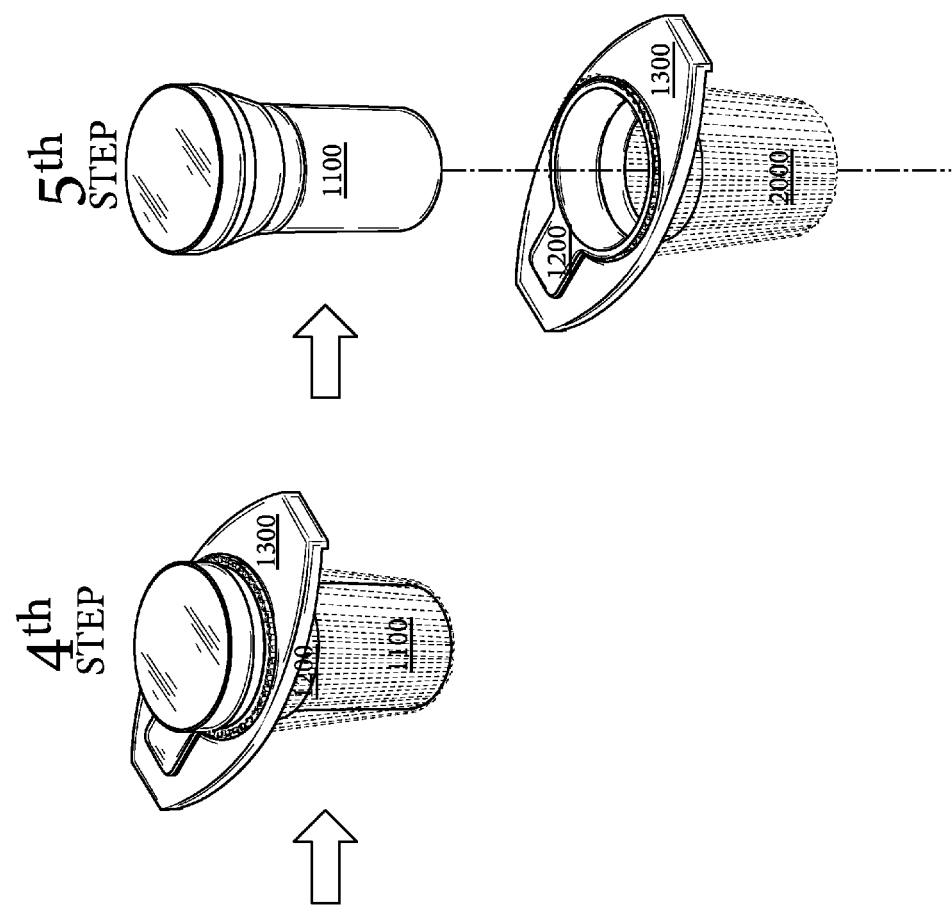
FIG. 10 is a continuation of the flow diagram of FIG. 9 for assembling another operable configuration for the beverage apparatus.

FIGS. 9 and 10 show a preferred mode of assembly for the brewing apparatus 1000. Referring to FIG. 9, first, the wedge ring 1200 is moved axially as indicated by the arrowed lines until the upper end or rim or abutment surface 1213 is in abutting engagement with the tapering surface 1111 of the plunger 1100. Second, a filter 2000 (e.g., a standard basket filter) is positioned about the exterior wall of the plunger with the wedge ring 1200 about the exterior of the plunger 1100, as shown. Third, the filter may be shaped or formed by manually crushing it so as to conform generally to the configuration of the plunger. During this step, the base 1300 may be moved axially in the direction of the arrowed lines over the filter paper 2000, which is now on the exterior of the plunger, until the lip 1321 abuts the external surface of the tapered annulus 1310 of the wedge ring 1300. Fourth, the movement of the base 1300 captivates the margin of the filter 2000. In the fourth step, the base captivates the margine of the filter against the restriction fit of the wedge ring 1300 as the three components are coaxially merged.

Figure 11:
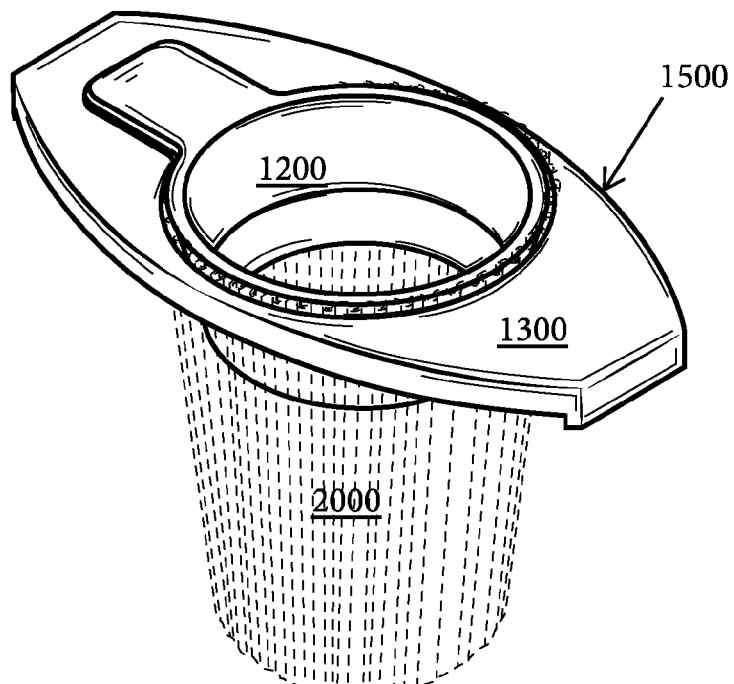
FIG. 11 is a perspective view of the operable configuration shown in FIG. 10.
Figure 12:
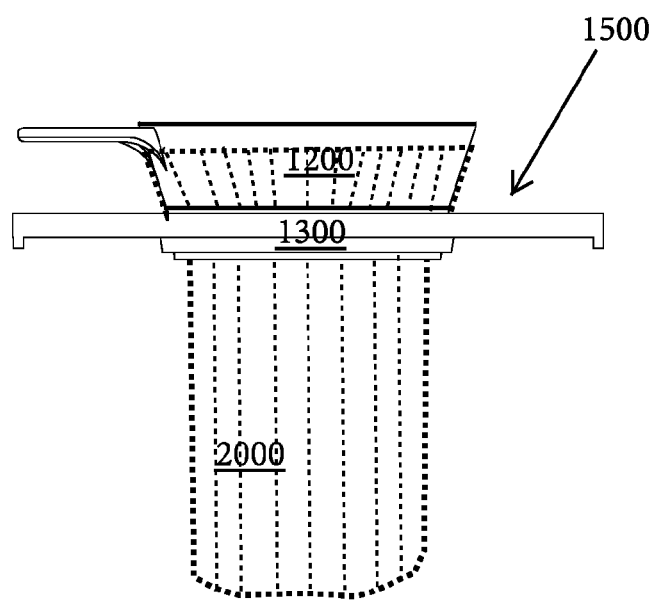
FIG. 12 is a side view of the operable configuration shown in FIG. 11.

Referring to FIG. 10, in the fifth step, the base 1300 and wedge ring 1200, together with the shaped or formed filter paper 2000 captivated therebetween, are removed by axially moving the combination from the plunger 1100. Suitably, the plunger may be set aside, as shown in FIGS. 11 and 12, so that the filter 2000 may be dangled over or within a beverage container.

Figure 13:
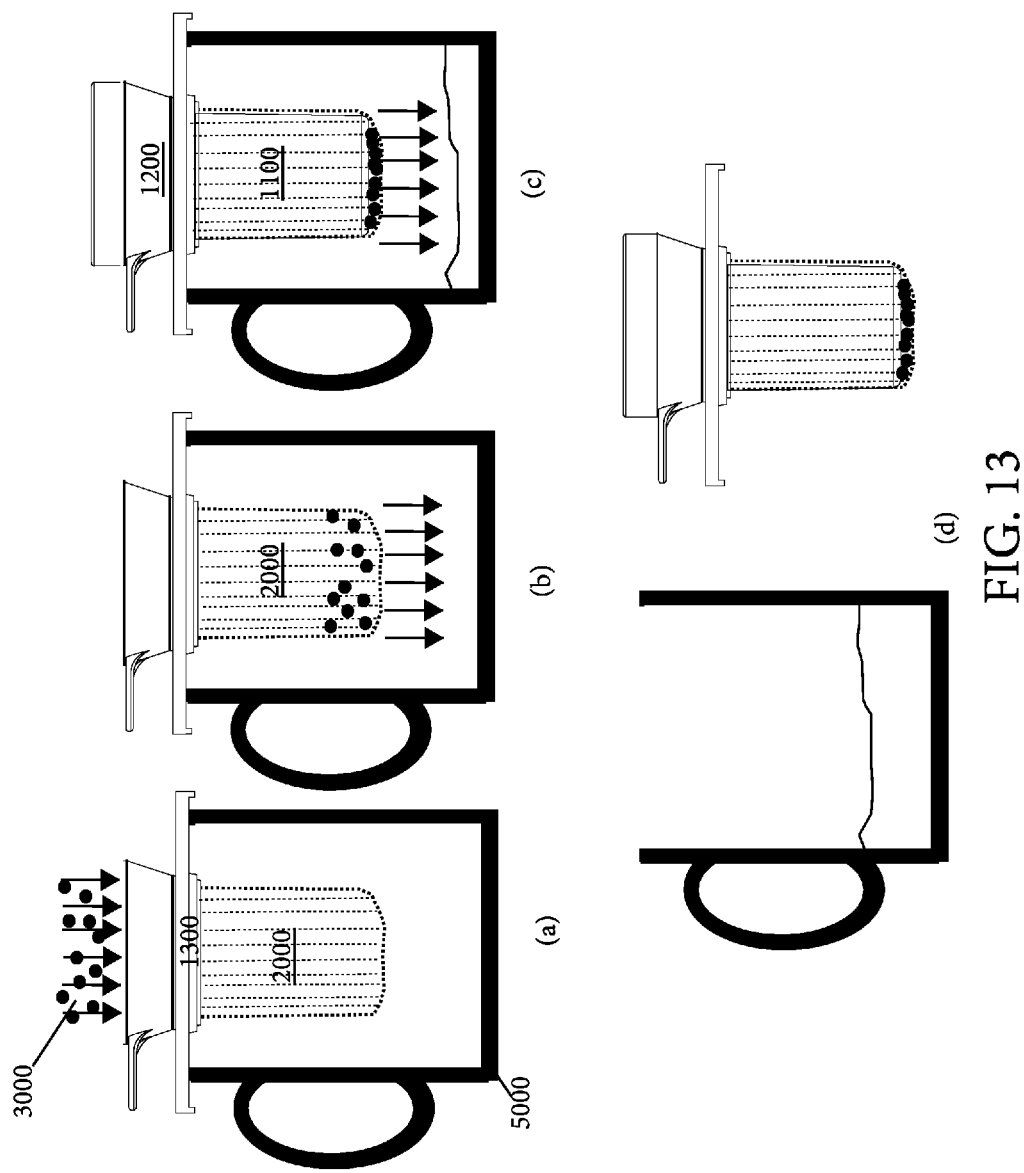
FIG. 13 is a schematic for brewing a beverage according to one methodology wherein the apparatus operates as a filter for a steeped beverage.

FIG. 13 illustrates a flow diagram for the use of the assembly 1500 as a filter for a steeped beverage 3000. As shown in part (a), the assembly 1500 may be supported over a beverage container 5000 via the base 1300 so that the filter 2000 dangles into the beverage container 5000. Still referring to part (a), the steeped beverage may be poured through the filter 2000 into the beverage container 5000. As shown in part (b), the beverage will continue through the filter 2000 into the beverage container 5000. As shown in part (c), if any remnants of the steeped beverage remains in the filtered material collected by the filter 2000, the plunger 1000 may be inserted into the filter to press any remaining beverage into the beverage container 5000. Finally (part (d)), the assembly 1500, may be removed and the beverage consumed.

Figure 14:
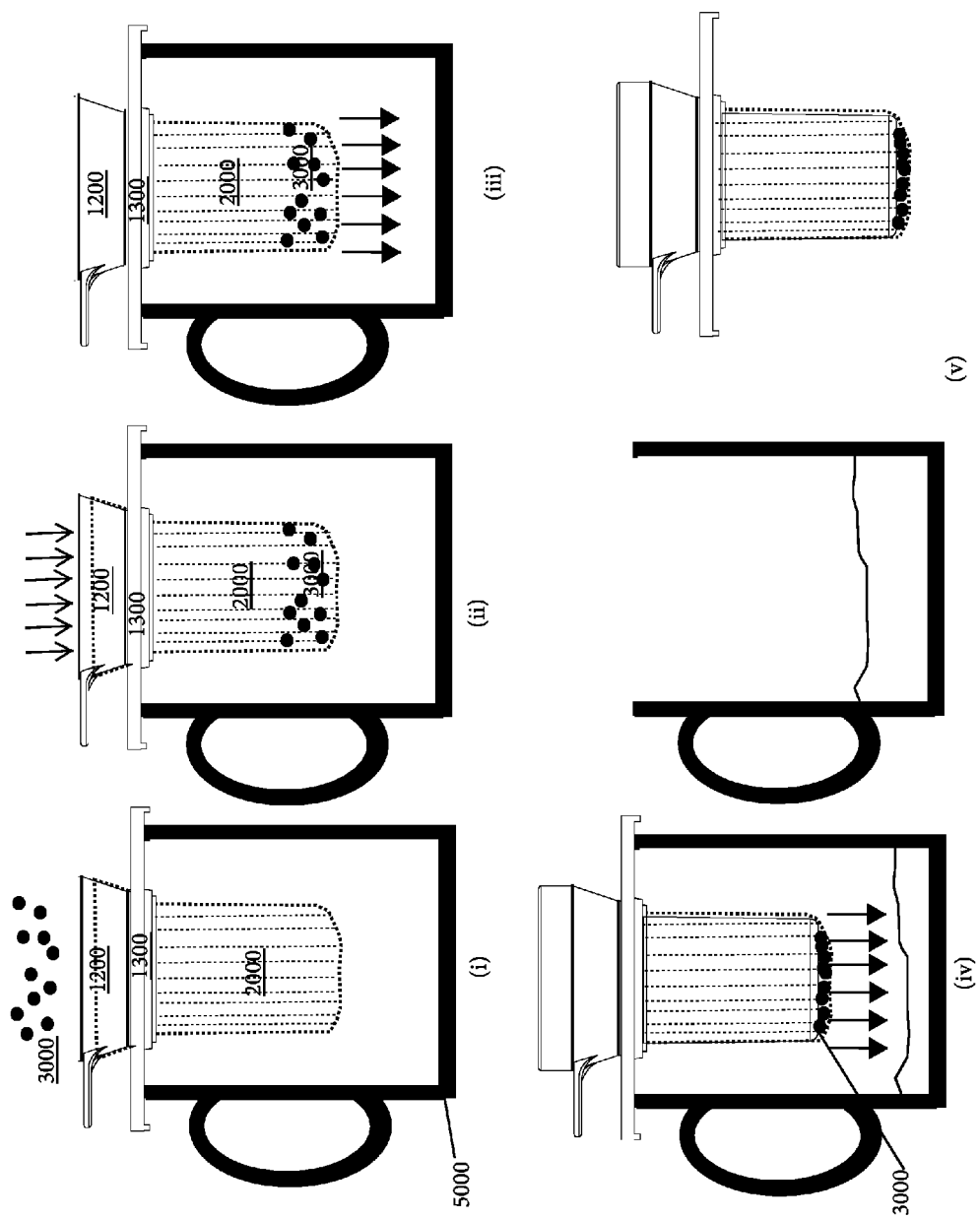
FIG. 14 is a schematic for brewing a beverage according to one methodology wherein the apparatus operates as a filter for a pour over brewing process.

FIG. 14 illustrates a flow diagram for the use of the assembly 1500 as a filter for a pour over brewing process. As shown in part (i), the assembly 1500 may be supported over a beverage container 5000 via the base 1300 so that the filter 2000 dangles into the beverage container 5000. Still referring to part (i), a beverage material 3000, like coffee grinds or tea leaves, may be provided into the filter. Referring to part (ii), water or other fluid may be poured through the filter 2000 into the beverage container 5000 and the beverage material 3000. As shown in part (iii), the beverage will continue through the filter 2000 into the beverage container 5000. As shown in part (iv), if any remnants of the beverage remains in the beverage material 3000 within the filter 2000, the plunger 1000 may be inserted into the filter to press any remaining beverage into the beverage container 5000. Finally (part (v)), the assembly 1500, may be removed and the beverage consumed.

Figure 15:
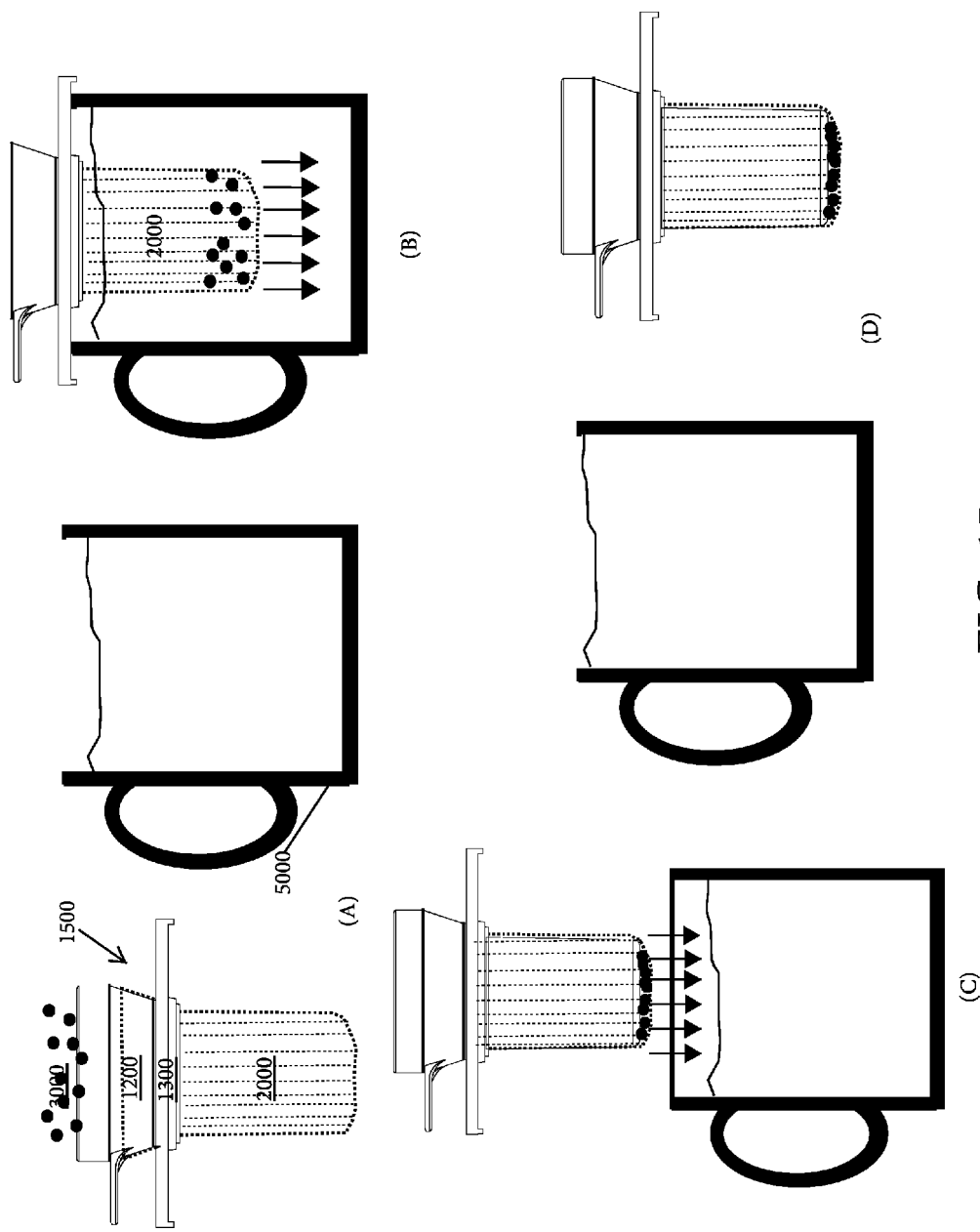
FIG. 15 is a schematic for brewing a beverage according to one methodology wherein the apparatus operates as a filter for a steep brewing process.

FIG. 15 illustrates a flow diagram for the use of the assembly 1500 as a filter for a steep brewing process. As shown in part (A), a beverage material 3000, like coffee grinds or tea leaves, may be provided into the filter 2000. Referring to part (B), the assembly 1500 may be supported over a beverage container 5000 via the base 1300 so that the filter 2000 dangles into the beverage container 5000 and into a steeping fluid. Still referring to part (B), the beverage may suitably steep through the filter 2000. Suitably, the beverage will continue through the filter 2000 into the beverage container 5000. As shown in part (C), if any remnants of the beverage remains in the beverage material 3000 within the filter 2000, assembly 1500 may be removed from the beverage container and the plunger 1000 may be inserted into the filter to press any remaining beverage into the beverage container 5000. Finally (part (D)), the assembly 1500, may be removed and the beverage consumed.

Figure 16:
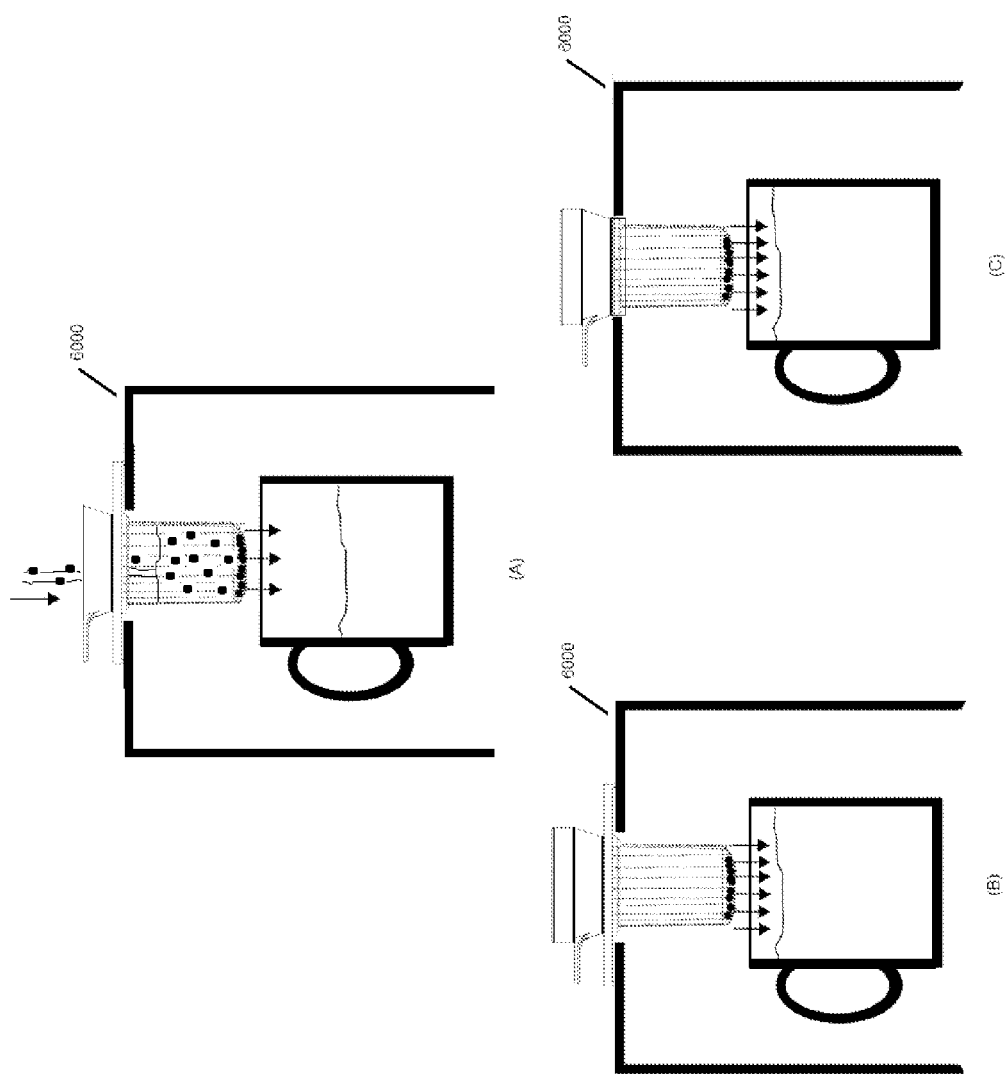
FIG. 16 is a schematic for brewing a beverage according to one methodology wherein the apparatus operates as a strainer for a modified version of a pour over brewing process.

FIG. 16 shows an alternative pour over brewing process wherein the assembly 1500 is supported by a frame 6000 and dangled over a beverage container 5000 for immediate filtering or straining of a beverage. As shown in part (A) the assembly 1500 may be supported over a beverage container 5000 via an apparatus 6000 so that the filter 2000 dangles over the beverage container 5000. Still referring to part (A), the beverage may suitably be poured through the filter 2000. Suitably, the beverage will continue through the filter 2000 into the beverage container 5000. As shown in part (B), if any remnants of the beverage remains in the beverage material 3000 within the filter 2000, the plunger 1000 may be inserted into the filter to press any remaining beverage into the beverage container 5000. In one embodiment shown in part (C), the frame 6000 can replace the base 1300 of the assembly 1500 when a hole or orifice through the frame 6000 is the same or similar in diameter to the wedge ring 1200.

Figure 17:
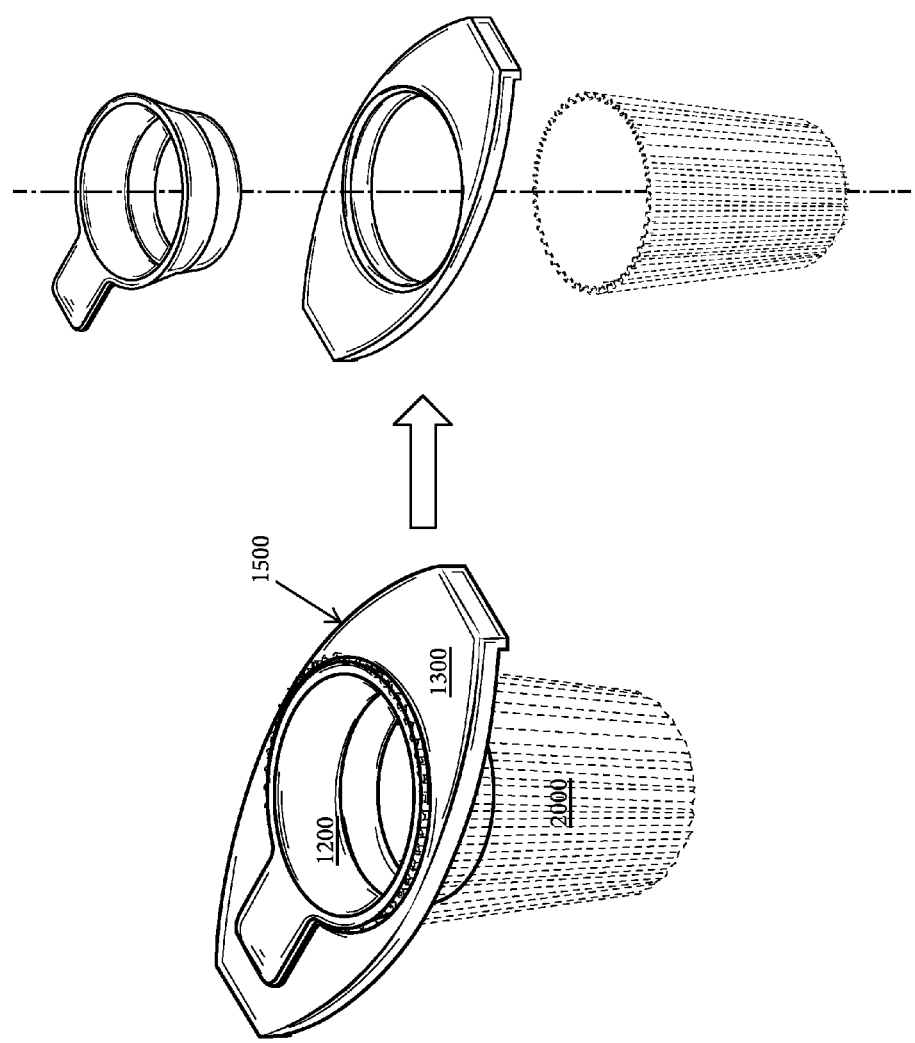
FIG. 17 is a diagram for disassembling the brewing apparatus.

FIG. 17 is a diagram for disassembling the brewing apparatus assembly 1500. As shown, the assembly 1500 may be disassembled via pulling the pull tab 1210 of the wedge ring to separate the same from the base 1300. Suitably, after separation of the base 1300 and the wedge ring 1200, the filter 2000 will fall through the orifice in the base and may be discarded.

While the invention has been shown in a preferred embodiment, including a generally tubular or inverted truncated cone-shaped cup, it is recognized that departures may be made in the form of the cup and the mating matching rings to accommodate a square-shaped cup, for example; and it is further recognized that departures may be made from the invention as described within the spirit of this invention which is therefore not to be limited except as set forth in the claims which follow.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the e term "including" should be read as meaning "including, without limitation" or the like, the term "example" is used to provide exemplary instances of the Item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein.

I claim:
1. A method of brewing comprising
   a. Molding a filter around a plunger and positioning a margin of the filter between a wedge ring and a base;
   b. Removing the plunger from the filter so that the filter retains a form of the plunger;
   c. Providing a beverage material to the filter;
   d. Pouring a brewing liquid into the filter; and,
   e. Pressing the beverage material and the brewing liquid in the filter via the plunger so that the brewing liquid passes through the filter while the beverage material is retained by the filter.

\* \* \* \* \*